United States Patent
Yu et al.

(10) Patent No.: US 9,423,246 B2
(45) Date of Patent: Aug. 23, 2016

(54) THREE-DIMENSIONAL MEASUREMENT SYSTEM

(71) Applicant: Test Research, Inc., Taipei (TW)

(72) Inventors: Liang-Pin Yu, New Taipei (TW); Don Lin, Taipei (TW); Chih-Tien Tsai, Taipei (TW)

(73) Assignee: Test Research, Inc., Taipei (TW)

( * ) Notice: Subject to any disclaimer, the term of this patent is extended or adjusted under 35 U.S.C. 154(b) by 312 days.

(21) Appl. No.: 13/732,690

(22) Filed: Jan. 2, 2013

(65) Prior Publication Data

US 2014/0009580 A1    Jan. 9, 2014

(30) Foreign Application Priority Data

Jul. 4, 2012  (TW) .............................. 101124041 A (51) Int. Cl.
  *G01B 11/24*  (2006.01)
  *G01B 11/25*  (2006.01)
(52) U.S. Cl.
  CPC .................................. *G01B 11/2513* (2013.01)
(58) Field of Classification Search
  CPC ........... G01B 11/24; G03B 27/72; G01J 1/00; F21V 7/00; H05B 41/38; A61B 1/04
  See application file for complete search history.

(56) References Cited

U.S. PATENT DOCUMENTS

| | | | | |
|---|---|---|---|---|
| 4,238,675 A | * | 12/1980 | Turlej et al. | 250/353 |
| 2006/0158664 A1 | * | 7/2006 | Koh et al. | 356/604 |
| 2007/0046778 A1 | * | 3/2007 | Ishihara | A61B 1/00009 348/68 |
| 2008/0088244 A1 | * | 4/2008 | Morishita | 315/154 |
| 2008/0106721 A1 | * | 5/2008 | Hirano | 355/68 |
| 2012/0147589 A1 | * | 6/2012 | Farmer | 362/84 |

FOREIGN PATENT DOCUMENTS

| | | |
|---|---|---|
| CN | 1748120 A | 3/2006 |
| CN | 101245998 A | 8/2008 |
| CN | 101726261 A | 6/2010 |
| TW | 200832078 A | 8/2008 |

* cited by examiner

*Primary Examiner* — Tarifur Chowdhury
*Assistant Examiner* — Jamil Ahmed
(74) *Attorney, Agent, or Firm* — Merchant & Gould P.C.

(57) ABSTRACT

A three-dimensional measurement system includes a measurement platform, a projection module, an image-capturing module, and a control unit. The measurement platform carries a test object. The projection module includes a light-emitting unit, a light-shielding rotary disc, a grating unit, and an optical-reflective ring structure. The light-emitting unit generates a light beam. An aperture formed in the light-shielding rotary disc is located at different rotational positions time-sequentially while the light-shielding rotary disc rotates, and the light beam passes through the aperture to form light beam segments. The grating unit transforms the light beam segments into stripe-patterned structure-light beams. The optical-reflective ring structure reflects the stripe-patterned structure-light beams onto the test object. The image-capturing module captures stripe-patterned images formed after reflection of the stripe-patterned structure-light beams from the test object. The control unit measures a three-dimensional shape of the test object using the stripe-patterned images.

8 Claims, 9 Drawing Sheets

THREE-DIMENSIONAL MEASUREMENT SYSTEM

RELATED APPLICATIONS

This application claims priority to Taiwan Application Serial Number 101124041, filed Jul. 4, 2012, which is herein incorporated by reference.

BACKGROUND

1. Technical Field

The invention relates to a three-dimensional measurement system and method thereof. More particularly, the invention relates to an optical configuration within a three-dimensional measurement system.

2. Description of Related Art

With the shrinking of the dimensions of electronic components in recent years, some automated high-precision testing equipment has been developed for performing detection of the appearance, circuitry connection and alignment relationship of electronic components. For example, the Solder Paste Inspection (SPI) machine has been widely used in production lines for performing precise measurements with respect to the size of solder paste on substrates, and has become a necessary tool for controlling the manufacturing process of printed circuit boards.

Among the various methods for measuring the three-dimensional shape of a DUT (device under test), there is one common measuring method based on Fringe pattern projection in the prior art. This measuring method involves utilizing a projector module to project an equal-spaced-multi-line pattern onto a DUT, and then reconstructing a three-dimensional surface profile of the DUT from 3~12 phase-shift images of the DUT.

In response to industry demands, technologies related to Solder Paste Inspection (SPI) are being improved continuously. For example, some traditional solutions sequentially project plural sets of Fringe Pattern onto a DUT that is being measured along different projective angles, and correspondingly obtain a three-dimensional shape from the reflective images of the DUT. These solutions may achieve faster speed and higher precision by utilizing plural sets of fringe pattern projections along different projective angles.

Typically, the multiple sets of fringe pattern projections along different projection angles are generated either by the same amount of multiple projector modules implemented together, or a single projector module implemented along with an optical path switching structure.

Among the above two techniques, implementing multiple projector modules at different angles is an straight forward solution for generating fringe pattern projections along different incident angles. However, this traditional solution requires one three-dimensional measurement apparatus to include multiple projector modules, each of which includes at least a light source, a grating unit and projective lenses. Therefore, this traditional solution leads to very high manufacturing cost, and huge space in the apparatus.

The other traditional approach involving the use of one projector module along with an optical path switching mechanism may be used to solve the aforesaid problems.

Figure 1:
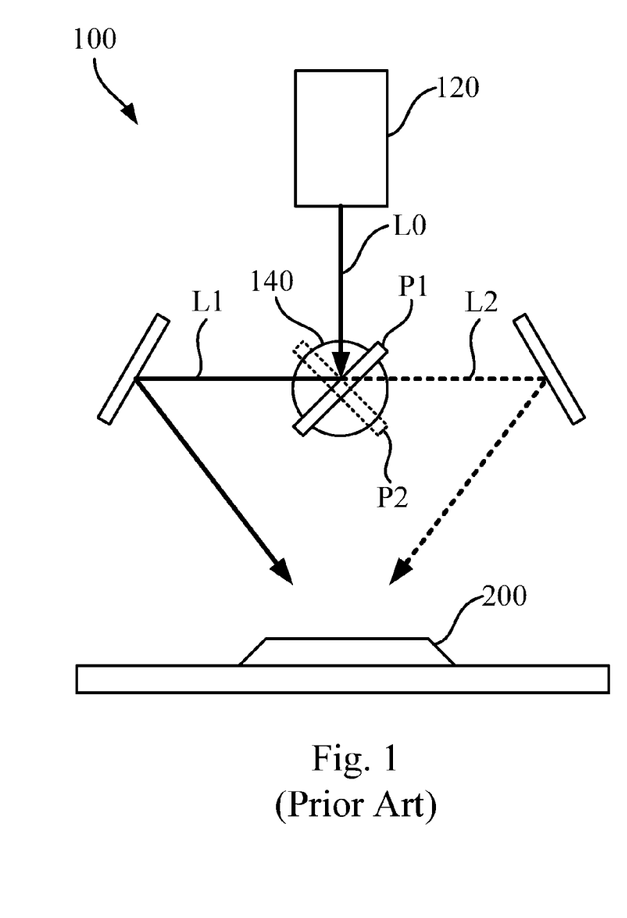
FIG. 1 is a schematic diagram illustrating a traditional three-dimensional measurement system and an optical path switching structure thereof.

FIG. 1 is a schematic diagram illustrating a traditional three-dimensional measurement system 100 and an optical path switching structure thereof.

As shown in FIG. 1, a light source 120 within a projector module of the traditional three-dimensional measurement system 100 generates a light beam L0. The light beam L0 is projected onto a switchable reflective mirror 140. The switchable reflective mirror 140 can be switched to selected positions. As an example, when the switchable reflective mirror 140 is switched to position P1, the light beam L0 is then reflected along the optical path L1 to the left, and subsequently onto a DUT (device under test) 200. As another example, when the switchable reflective mirror 140 switched to position P2, the light beam L0 is reflected along the optical path L2 to the right, and subsequently onto the DUT 200.

Figure 2:
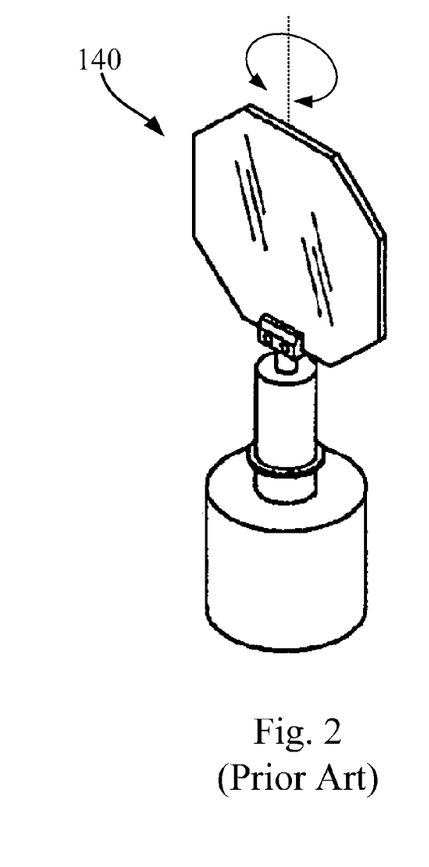
FIG. 2 is a perspective view of a rotatable reflective mirror shown in FIG. 1.
Figure 3:
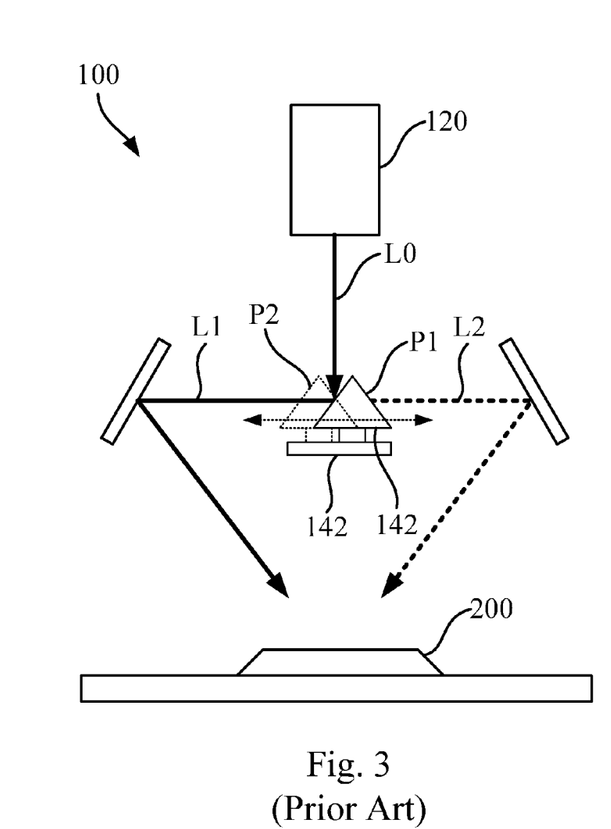
FIG. 3 is a schematic diagram illustrating another traditional three-dimensional measurement system and an optical path switching structure thereof.
Figure 4:
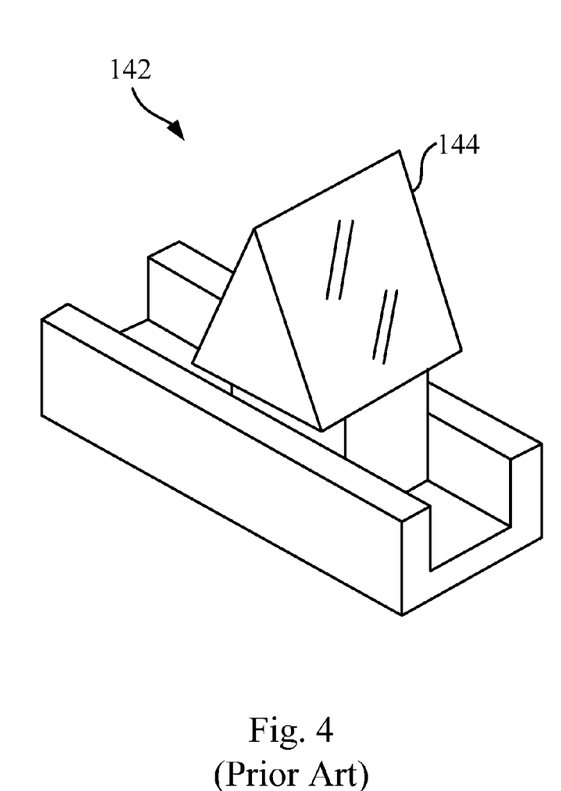
FIG. 4 is a perspective view of the optical path switching structure shown in FIG. 3.

As shown in FIG. 2, which is an isometric view of the switchable reflective mirror 140 shown in FIG. 1, the switchable reflective mirror 140 in this solution is an optical element on a mechanical base. However, the switching vibrations of both optical and mechanical parts will cause the fluctuation of the optical path. Therefore, this solution will result in an excessive inaccurate measurement unexpectedly Reference is now made to FIG. 3 and FIG. 4. FIG. 3 is a schematic diagram illustrating another known three-dimensional measurement system 100 and an optical path switching mechanism 142 thereof. FIG. 4 is an isometric view of the optical path switching mechanism 142 shown in FIG. 3.

As shown in FIG. 3 and FIG. 4, the optical path switching mechanism 142 has a sliding prism 144. The optical path is switched by changing the position of the sliding prism 144. As an example, when the sliding prism 144 slides to position P1 along the guiding slit, a light beam L0 is then reflected along the optical path L1 to the left, and subsequently onto a DUT (device under test) 200. As another example, when the sliding prism 144 slides to the position P2 along the guiding slit thereto, the light beam L0 is reflected along the optical path L2 to the right, and subsequently onto the DUT 200. With this configuration, there are the same issues on the optical path switching mechanism 142 as well. Therefore, this solution will result in the same excessive inaccurate measurement therewith.

SUMMARY

In order to solve the problems of the prior art, a technical aspect of the invention provides a three-dimensional measurement system. In an embodiment of the three-dimensional measurement system, a light-shielding rotary disc is disposed within a projection module of the three-dimensional measurement system. The light-shielding rotary disc may rotate, such that a light beam passes through an aperture formed in the light-shielding rotary disc and is formed into a plurality of light beam segments facing different directions in a time-sequential manner. Each of the light beam segments is transformed into a stripe-patterned structure-light beam (e.g., a fringe pattern projection light or a structure light of parallel sinusoid stripes pattern) and reflected by a fixed optical reflective structure onto a test object. In another embodiment of the three-dimensional measurement system, several light beams are generated by a plurality of light-emitting diodes. Each of the light beams is transformed into a stripe-patterned structure-light beam and reflected by a fixed optical reflective structure onto a test object. The three-dimensional measurement system may operate without implementing multiple sets of projection modules, so as to reduce manufacturing costs and the amount of space used by the device. In addition, with respect to the procedure of reflecting the stripe-patterned structure-light beam onto the test object by the optical reflective structure, it is noted that the optical reflective structure in the invention is a fixed structure instead of a structure that undergoes movement through mechanical means. Therefore, the invention may avoid the problems of accuracy associated with conventional configurations. As a result, measurement errors can be reduced to a minimum, and hence, a precise three-dimensional measurement may be obtained.

An aspect of the invention provides a three-dimensional measurement system that includes a measurement platform, a projection module, an image-capturing module and a control unit. The measurement platform is used for carrying a test object. The projection module includes a light-emitting unit, a light-shielding rotary disc, a grating unit and an optical-reflective ring structure. The light-emitting unit is used for generating a light beam. The light-emitting unit is disposed above the test object and is substantially located on a vertical axis of the measurement platform. The light-shielding rotary disc is disposed between the light-emitting unit and the test object and substantially located on the vertical axis. An aperture is formed in the light-shielding rotary disc. The aperture is located at different rotational positions time-sequentially while the light-shielding rotary disc rotates. The light beam passes through the aperture to form a plurality of light beam segments time-sequentially. The grating unit is disposed between the light-shielding rotary disc and the test object, and is used for transforming the light beam segments that pass through the aperture into a plurality of stripe-patterned structure-light beams (fringe pattern projections). The optical-reflective ring structure is disposed between the grating unit and the test object and surrounding the vertical axis, and used for reflecting the stripe-patterned structure-light beams onto the test object. The image-capturing module is used for capturing a plurality of stripe-patterned images, which are formed after reflection of the stripe-patterned structure-light beam from the test object. The control unit is used for controlling the projection module and the image-capturing module, and measuring a three-dimensional shape of the test object according to the stripe-patterned images.

According to an embodiment of the invention, the light-shielding rotary disc is substantially parallel to the measurement platform and rotated about a rotary axis. The rotary axis coincides with the vertical axis or is parallel to the vertical axis.

According to an embodiment of the invention, the optical-reflective ring structure includes a plurality of planar reflective mirrors. The planar reflective mirrors are fixed and disposed surrounding the vertical axis and facing the vertical axis.

According to an embodiment of the invention, each of the planar reflective mirrors corresponds to one of the stripe-patterned structure-light beams transformed from the light beam segments generated while the aperture of the light-shielding rotary disc is rotating time-sequentially.

According to an embodiment of the invention, the optical-reflective ring structure includes an optical-reflective annular mirror. The optical-reflective annular mirror is fixed and disposed surrounding the vertical axis, and a reflective surface of the optical-reflective annular mirror faces the vertical axis.

According to an embodiment of the invention, the stripe-patterned structure-light beams transformed from the light beam segments generated while the aperture of the light-shielding rotary disc is rotating time-sequentially are projected onto different positions of the optical-reflective annular mirror.

According to an embodiment of the invention, the light beam segments diverge outward relative to the vertical axis, and the stripe-patterned structure-light beams converge inward and are projected onto the test object after reflection from the optical-reflective ring structure.

According to an embodiment of the invention, the projection module further includes a grating shifter for moving the grating unit horizontally, so as to form different phase angles of the stripe-patterned structure-light beams. The image-capturing module further captures a plurality of stripe-patterned images, which are formed after reflection of the stripe-patterned structure-light beams with different phase angles from the test object.

Another aspect of the invention provides a three-dimensional measurement system, which includes a measurement platform, a projection module, an image-capturing module and a control unit. The measurement platform is used for carrying a test object. The projection module includes a substrate, a plurality of light-emitting diodes, a grating unit and an optical-reflective ring structure. The light-emitting diodes are disposed on the substrate. Each of the light-emitting diodes generates a directional light beam. The light-emitting diodes are disposed above the test object and are substantially located around a vertical axis of the measurement platform. The grating unit is disposed between the light-emitting diodes and the test object, and is used for transforming the directional light beams generated by the light-emitting diodes into a plurality of stripe-patterned structure-light beams. The optical-reflective ring structure is disposed between the grating unit and the test object, surrounds the vertical axis, and is used for reflecting the stripe-patterned structure-light beams onto the test object. The image-capturing module is used for capturing a plurality of stripe-patterned images, which are formed after reflection of the stripe-patterned structure-light beams from the test object. The control unit is used for controlling the projection module and the image-capturing module, and measuring a three-dimensional shape of the test object according to the stripe-patterned images.

According to an embodiment of the invention, the optical-reflective ring structure includes a plurality of planar reflective mirrors. The planar reflective mirrors are fixed and disposed surrounding the vertical axis and facing the vertical axis.

According to an embodiment of the invention, each of the light-emitting diodes faces one of the planar reflective mirrors. Each of the directional light beams generated by the light-emitting diodes is transformed into one of the stripe-patterned structure-light beams and projected onto one corresponding planar reflective mirror.

According to an embodiment of the invention, the optical-reflective ring structure includes an optical-reflective annular mirror. The optical-reflective annular mirror is fixed and disposed surrounding the vertical axis. A reflective surface of the optical-reflective annular mirror faces the vertical axis.

According to an embodiment of the invention, the stripe-patterned structure-light beams transformed from the directional light beams are projected onto different positions of the optical-reflective annular mirror.

According to an embodiment of the invention, the directional light beams generated by the light-emitting diodes diverge outward relative to the vertical axis, and the stripe-patterned structure-light beams converge inward and are projected onto the test object after reflection from the optical reflective ring structure.

According to an embodiment of the invention, the projection module further includes a grating shifter for moving the grating unit horizontally, so as to form different phase angles of the stripe-patterned structure-light beams. The image-capturing module further captures a plurality of stripe-patterned images, which are formed after reflection of the stripe-patterned structure-light beams with different phase angles from the test object.

BRIEF DESCRIPTION OF THE DRAWINGS

In order to make the foregoing as well as other purposes, features, advantages, and embodiments of the invention more apparent, the accompanying drawings are described as follows.

DETAILED DESCRIPTION

A plurality of embodiments of the invention will be disclosed hereafter with reference to the drawings. For purposes of clear illustration, many details of practical applications will be described in the following disclosure. However, it should be understood that these details of practical applications are not intended to limit the invention. That is, in some embodiments of the invention, these details are not necessary. Furthermore, for purpose of simplifying the drawings, some conventional structures and components in the drawings will be shown schematically.

Figure 5A:
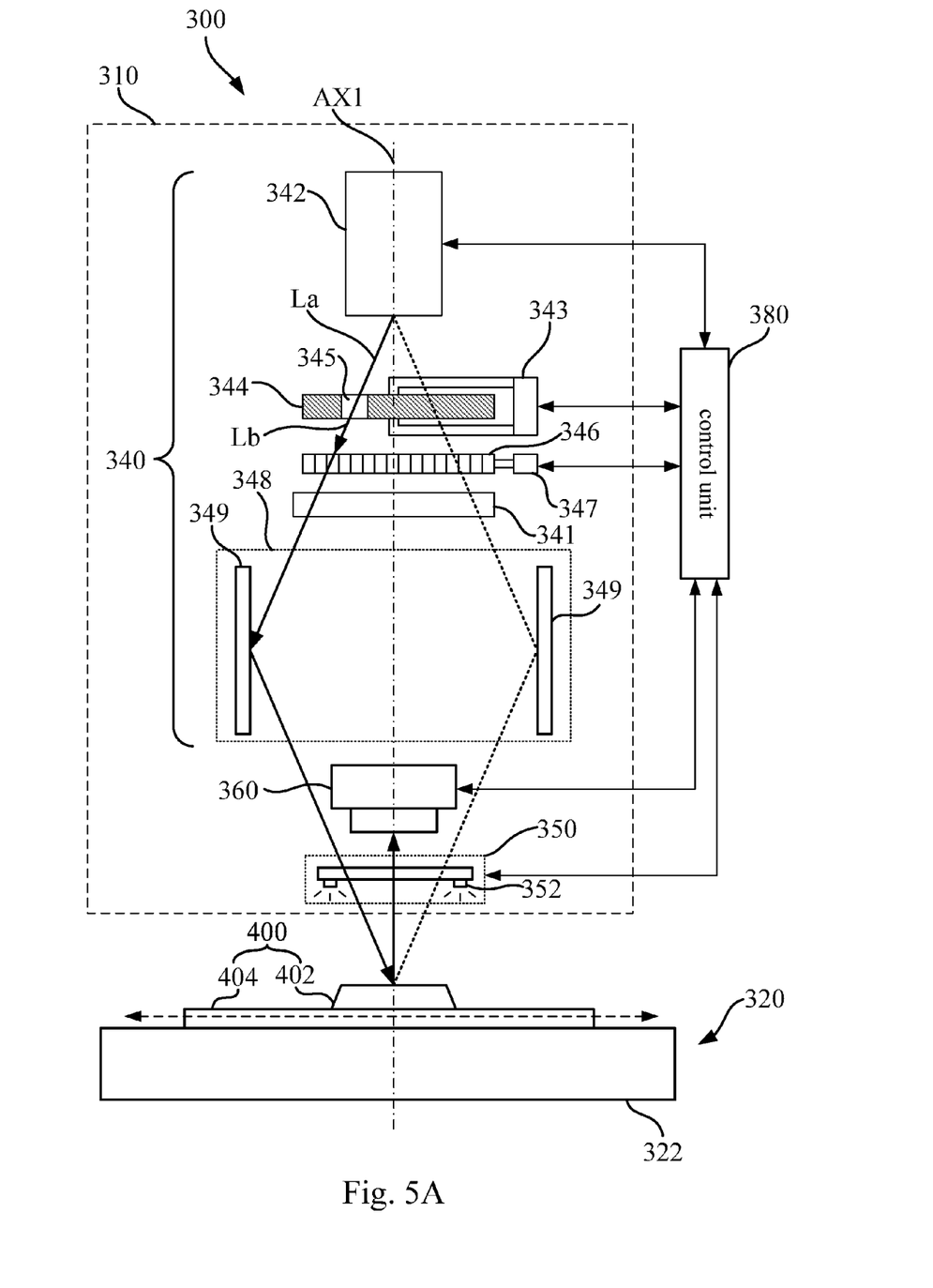
FIG. 5A and FIG. 5B are schematic diagrams illustrating a three-dimensional measurement system according to an embodiment of the invention.
Figure 5B:
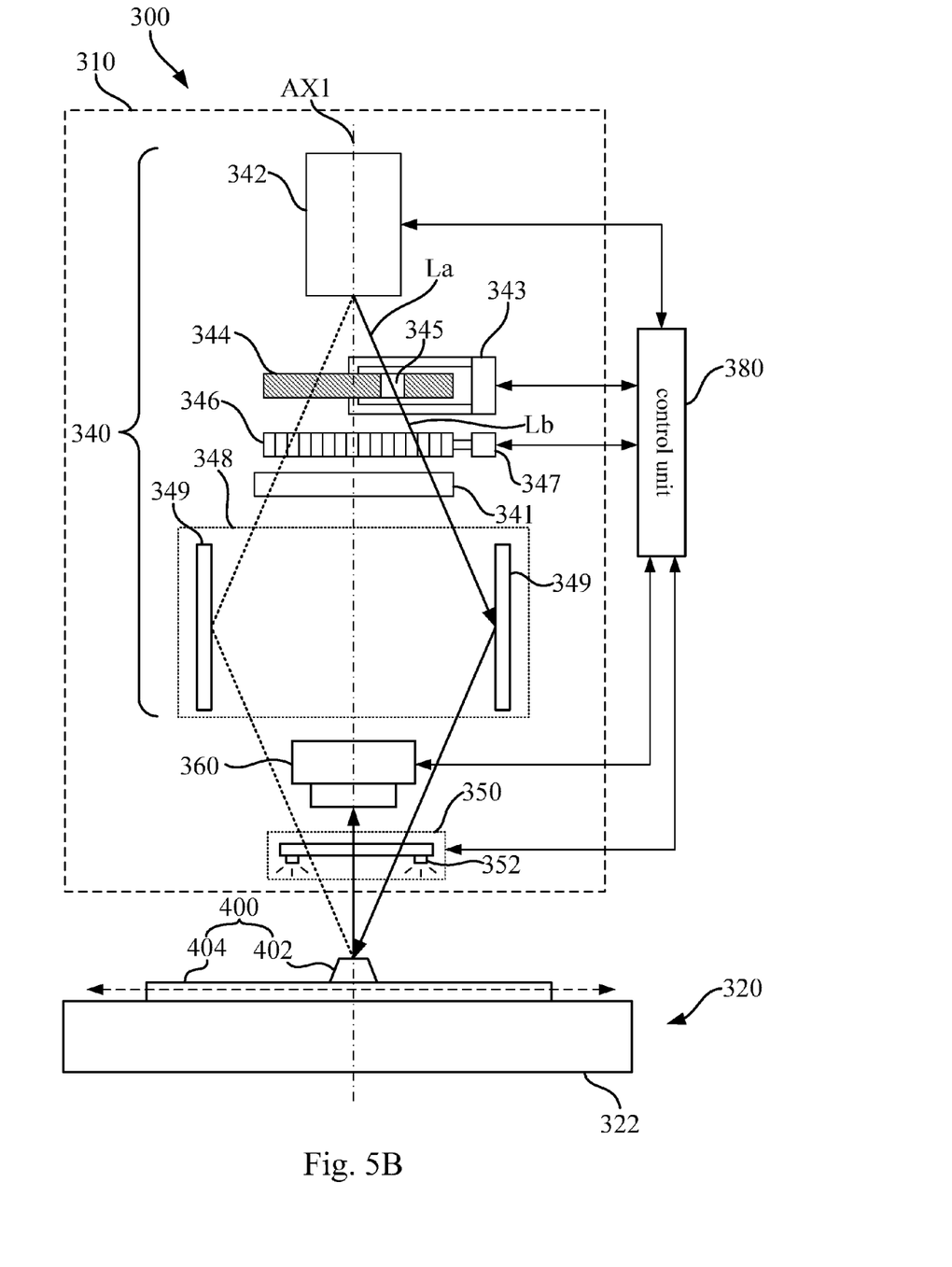

Reference is made to FIG. 5A and FIG. 5B, which are schematic diagrams illustrating a three-dimensional measurement system 300 according to an embodiment of the invention. As shown in FIG. 5A, the three-dimensional measurement system 300 includes a measurement carrier 320, a projection module 340, an image-capturing module 360 and a control unit 380.

The measurement carrier 320 includes a measurement platform 322. The measurement platform 322 is used for carrying a test object 400. In the embodiment shown in FIG. 5A and FIG. 5B, a movable portion 310 of the three-dimensional measurement system 300 may move (e.g., shift, rotate or tilt) along three directional axes (e.g., an X-directional axis, a Y-directional axis and a Z-directional axis) relative to the test object 400 and the measurement carrier 320. In this embodiment, the movable portion 310 includes the projection module 340 and the image-capturing module 360 (and may further include a auxiliary ring light source module 350), such that the projection module 340 and the image-capturing module 360 of the three-dimensional measurement system 300 may project onto or capture from different positions, phases or angles of the test object 400. The projection module 340 and the image-capturing module 360 (and also the auxiliary ring light source module 350) within the movable portion 310 are linked. When the movable portion 310 of the three-dimensional measurement system 300 moves, the projection module 340 and the image-capturing module 360 (and also the auxiliary ring light source module 350) move together.

In this embodiment, the test object 400 may include a substrate 404 and an object 402 located on the substrate 404. In some applications, the object 402 can be solder paste on the substrate 404. The object 402 may also be circuitry or an equivalent electronic component. The three-dimensional measurement system 300 is utilized to measure the three-dimensional shape of the test object 400 including the substrate 404 and any object 402 located on the substrate 404. In the following paragraphs, it will be assumed that the test object 400 includes the substrate 404 and any object 402 located on the substrate 404.

As shown in FIG. 5A, the projection module 340 includes a light-emitting unit 342, a light-shielding rotary disc 344, a grating unit 346 and an optical-reflective ring structure 348. In addition, the projection module 340 may further include a projection lenses combination 341. The projection lenses combination 341 can be disposed between the grating unit 346 and the optical-reflective ring structure 348, but the invention is not limited thereto.

Figure 6A:
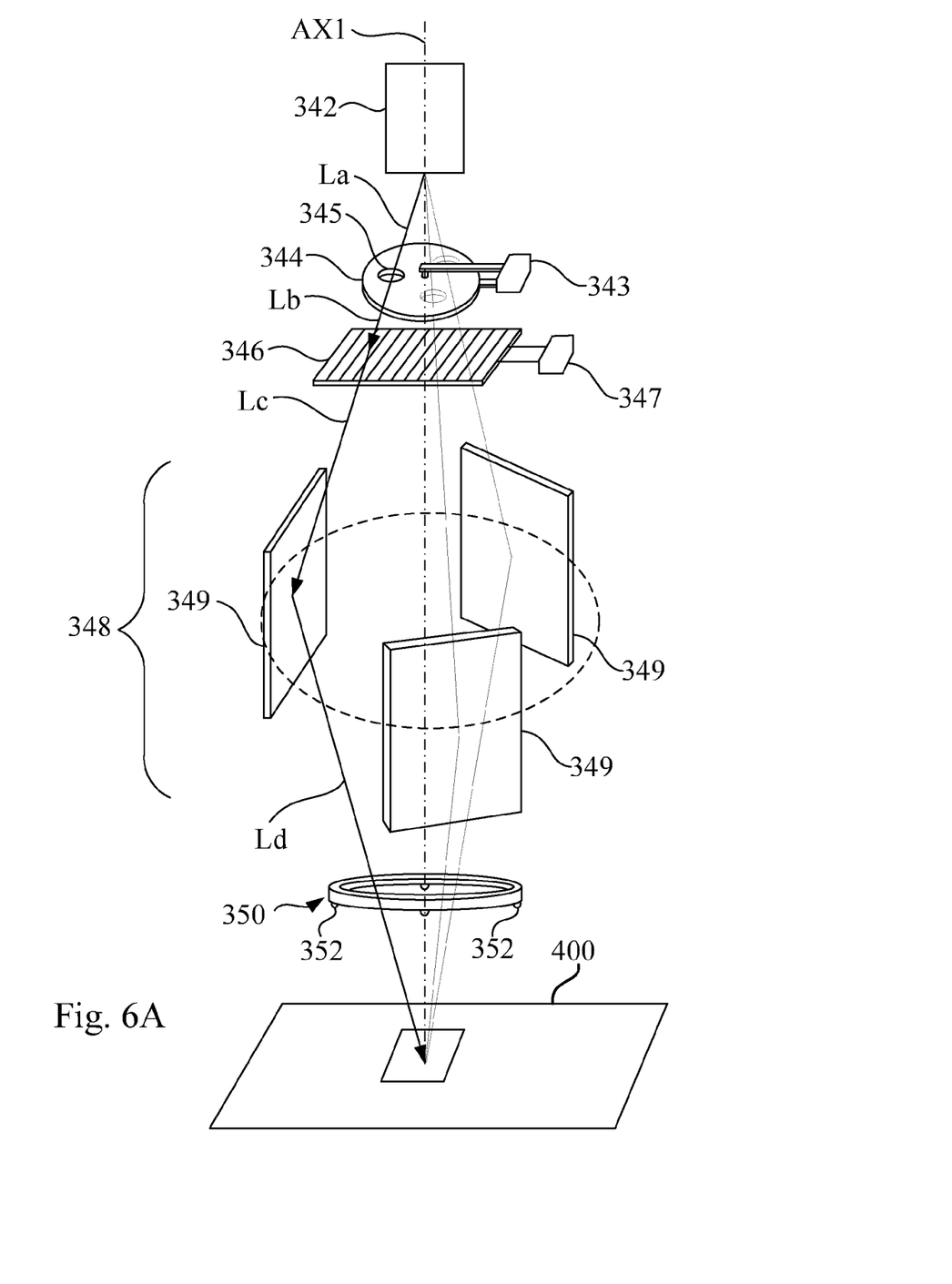
FIG. 6A, FIG. 6B and FIG. 6C are schematic diagrams illustrating a projection module and an optical-reflective ring structure thereof according to three different embodiments of the invention.

Reference is also made to FIG. 6A, which is a schematic diagram illustrating the projection module 340 according to an embodiment of the invention.

As shown in FIG. 5A and FIG. 6A, the light-emitting unit 342 is used for generating a light beam La. The light-emitting unit 342 is disposed above the test object 400 and is substantially located on a vertical axis AX1 of the measurement platform 322.

It is noted that the vertical axis AX1 in this disclosure is used for explaining the positional relationship between components within the embodiment, and the actual configuration of the components in the invention is not limited thereto. For example, the vertical axis AX1 in the embodiment can be a central axis of the measurement platform 322 (e.g., located at the center of the measurement platform 322 and perpendicular to the measurement platform 322), but the invention is not limited thereto. In another embodiment, the vertical axis AX1 can be located at another position of the measurement platform 322, or tilted by a specific angle from the central axis of the measurement platform 322.

The light-shielding rotary disc 344 is disposed between the light-emitting unit 342 and the test object 400, and is substantially located on the vertical axis AX1. There is an aperture 345 formed in the light-shielding rotary disc 344. In the embodiment, the projection module 340 further includes a rotating component 343 for rotating the light-shielding rotary disc 344.

In the embodiment, the light-shielding rotary disc 344 is substantially parallel to the measurement platform 322 and rotated about a rotary axis. In the embodiment, the rotary axis coincides with the vertical axis AX1, but the invention is not limited thereto. In another embodiment, the rotary axis can be parallel to the vertical axis AX1.

When the light-shielding rotary disc 344 is driven to rotate by the rotating component 343, the aperture 345 is rotated and located at different rotational positions time-sequentially. The light beam La passes through the aperture 345 and forms a plurality of light beam segments Lb time-sequentially. As shown in FIG. 5A, when the aperture 345 is rotated to the left side, the light beam La passes through the aperture 345 and forms a plurality of light beam segments Lb projected to the left side in FIG. 5A time-sequentially. On the other hand, as shown in FIG. 5B, when the aperture 345 is rotated to the right side, the light beam La passes through the aperture 345 and forms other light beam segments Lb projected to the right side in FIG. 5B time-sequentially.

In this embodiment, since the location of the aperture 345 varies sequentially with time, the light beam generated by the light-emitting unit 342 forms a plurality of light beam segments Lb in a time-sequential manner. In the embodiment, the light beam segments Lb substantially diverge outward.

The grating unit 346 is disposed between the light-shielding rotary disc 344 and the test object 400. The grating unit 346 can be transparent lenses with stripes. The stripes of the grating unit 346 are spaced apart by a specific pitch. The grating unit 346 is used for transforming the light beam segments Lb into a plurality of stripe-patterned structure-light beams Lc (e.g., a fringe pattern projection light or a structure light of parallel sinusoid stripes pattern), as shown in FIG. 6A.

In this embodiment, the projection module 340 further includes a grating shifter 347 for shifting the grating unit 346 along a horizontal direction, so as to form different phase angles of the stripe-patterned structure-light beams Lc. The image-capturing module 360 further captures a plurality of stripe-patterned images, which are formed after reflection of the stripe-patterned structure-light beams Lc with different phase angles from the test object 400. Since the phase-shifting measuring method for three-dimensional measurement is well known by those of ordinary skill in the art, details in this regard will not be provided.

In actual application, the projection lenses combination 341 of the projection module 340 includes the necessary optical lenses combination (e.g., convex lenses and piano lenses). In the embodiment, the projection lenses combination 341 can be disposed between the grating unit 346 and the optical-reflective ring structure 348, but the invention is not limited thereto. In actual application, the projection lenses combination 341 and configuration of the lenses combination thereof can be arranged or modified according to the overall design, and such arrangements and modifications are well known by those of common skills in the art.

In the embodiment, the optical-reflective ring structure 348 is disposed between the grating unit 346 and the test object 400, and surrounding the vertical axis AX1. The optical-reflective ring structure 348 is used for reflecting the stripe-patterned structure-light beams Lc (for example, the stripe-patterned structure-light beams Lc projected to the left side and the right side shown in FIG. 5A and FIG. 5B), which are at different angles and at different time sequences, onto the test object 400. In other words, the light beam segments Lb substantially diverge outward relative to the vertical axis AX1, and the stripe-patterned structure-light beams Lc after transformation also substantially diverge outward. After reflection by the optical-reflective ring structure 348, stripe-patterned structure-light beams Ld (Fringe pattern projections) are formed, and these stripe-patterned structure-light beams Ld converge inward and are projected onto the test object 400.

The image-capturing module 360 is used for capturing a plurality of stripe-patterned images, which are formed after reflection of the stripe-patterned structure-light beams Ld from the test object 400. The control unit 380 is used for controlling the projection module 340 and the image-capturing module 360, and measuring a three-dimensional shape of the test object 400 according to the stripe-patterned images.

Figure 6B:
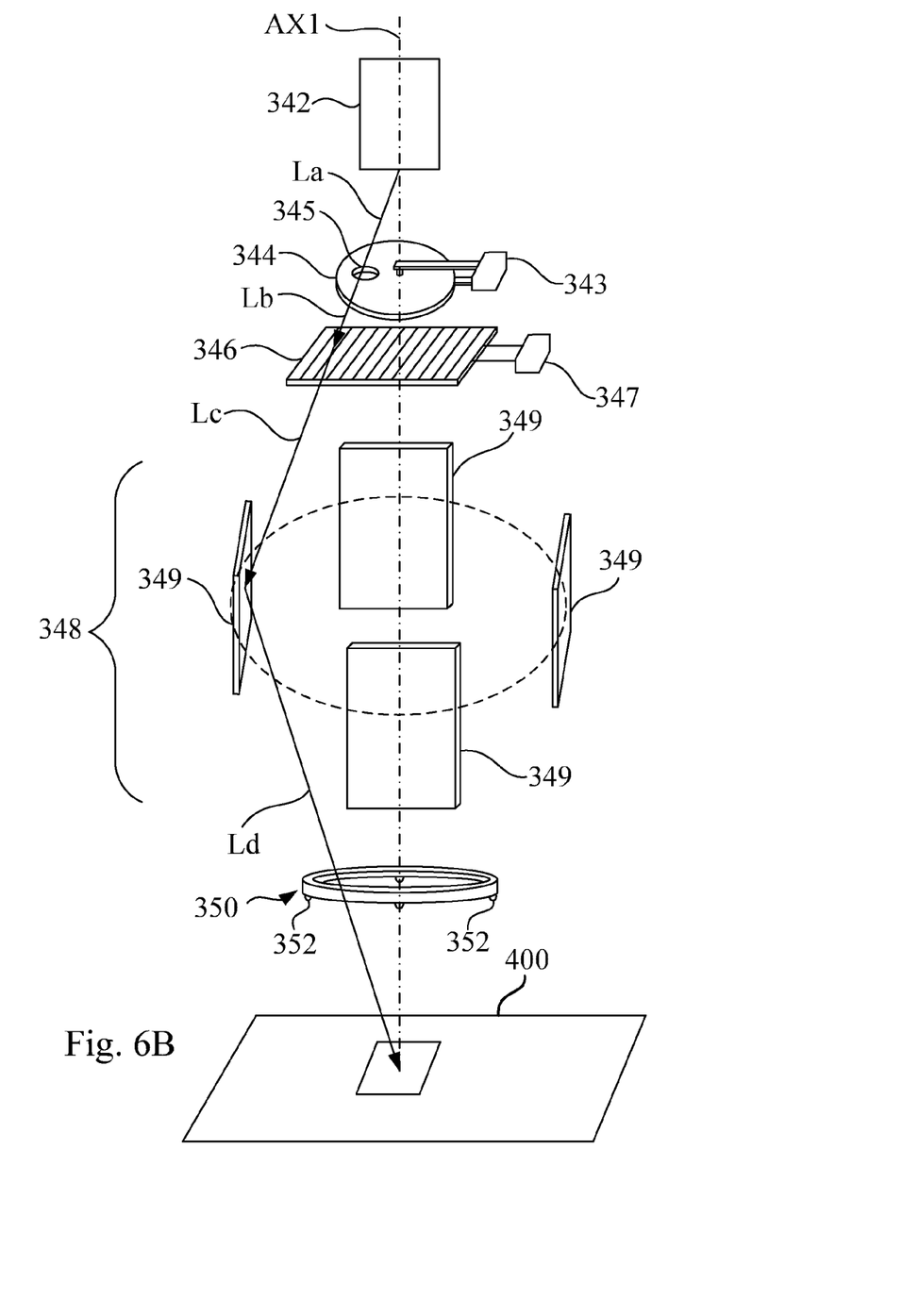
Figure 6C:
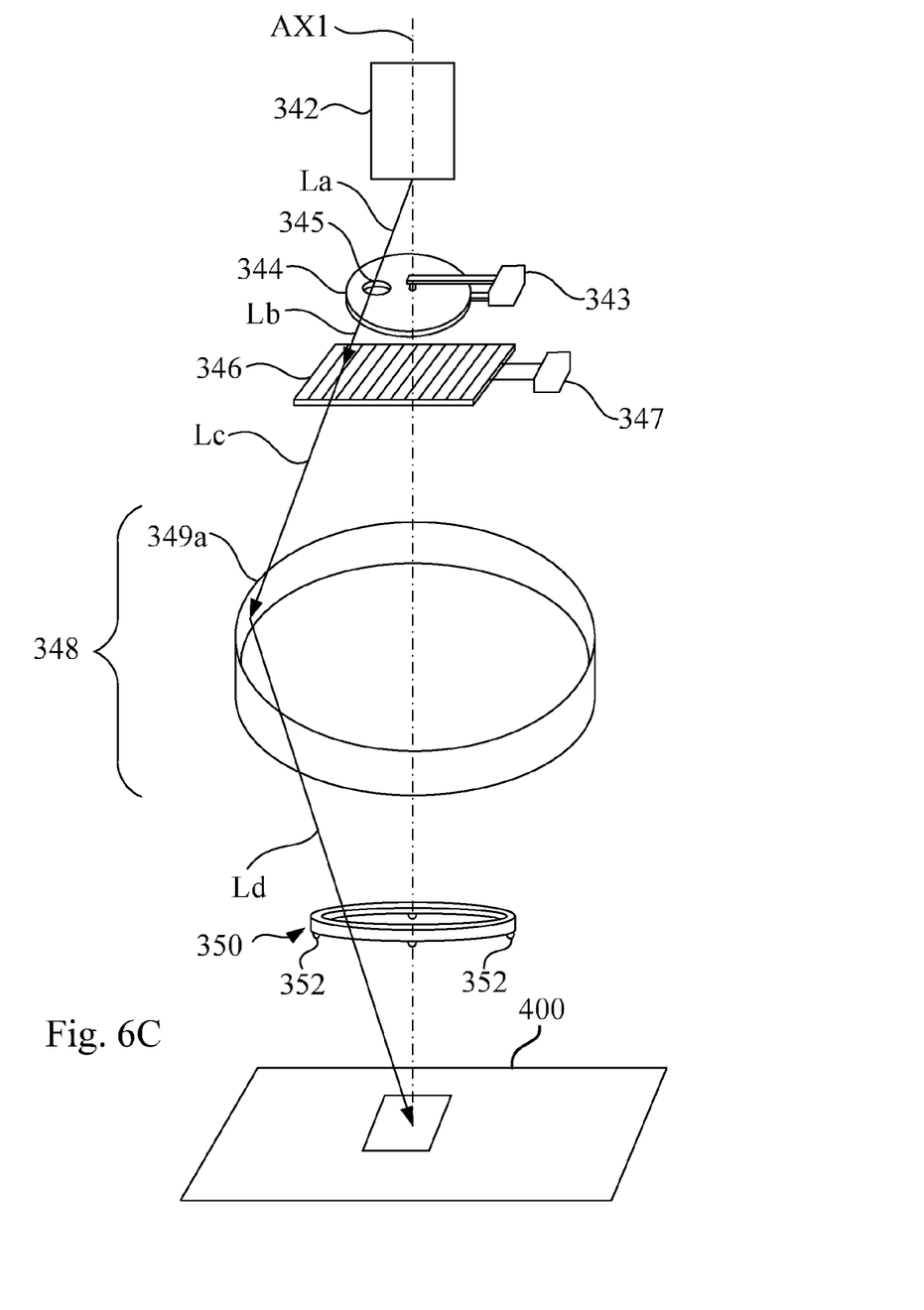

It is to be noted that the optical-reflective ring structure 348 is not limited to being a ring component formed in a single piece. Reference is made to FIG. 6A to FIG. 6C, which are schematic diagrams illustrating the projection module and the optical-reflective ring structure 348 thereof in three different embodiments of the invention.

In the embodiment shown in FIG. 6A, the optical-reflective ring structure 348 includes three planar reflective mirrors 349 each having a reflective surface. The three planar reflective mirrors 349 are fixed and disposed surrounding the vertical axis AX1. Each of the reflective surfaces of the planar reflective mirrors 349 faces the vertical axis AX1. The stripe-patterned structure-light beams Ld reflected by the optical-reflective ring structure 348 converge inward and are projected onto the test object 400.

In the embodiment shown in FIG. 6A, each of the planar reflective mirrors 349 corresponds to one of the stripe-patterned structure-light beams Lc transformed from the light beam segments Lb and generated while the aperture 345 of the light-shielding rotary disc 344 is rotating time-sequentially (e.g., rotated to locations at 0 degrees, 120 degrees and 240 degrees in a time-sequential manner).

The optical-reflective ring structure 348 is not limited to include three planar reflective mirrors 349. Reference is made to FIG. 6B, which is a schematic diagram illustrating the projection module 340 according to another embodiment of the invention. In the embodiment shown in FIG. 6B, the optical-reflective ring structure 348 includes four planar reflective mirrors 349 each having a reflective surface. The four planar reflective mirrors 349 are fixed and disposed surrounding the vertical axis AX1. Each of the reflective surfaces of the planar reflective mirrors 349 faces the vertical axis AX1. Each of the four planar reflective mirrors 349 corresponds to one of the stripe-patterned structure-light beams Lc transformed from the light beam segments Lb and generated while the aperture 345 of the light-shielding rotary disc 344 is rotating time-sequentially (e.g., rotated to locations at 0 degrees, 90 degrees, 180 degrees and 270 degrees in a time-sequential manner).

Hence, the optical-reflective ring structure 348 can be realized by multiple planar reflective mirrors 349 disposed in a ring configuration, and are not limited to being realized using any specific number of the planar reflective mirrors 349.

The optical-reflective ring structure 348 of the invention is not limited to include multiple planar reflective mirrors 349. Reference is made to FIG. 6C, which is a schematic diagram illustrating the projection module 340 according to another embodiment of the invention. In the embodiment shown in FIG. 6C, the optical-reflective ring structure 348 includes an optical-reflective annular mirror 349*a*. The optical-reflective annular mirror 349*a* is fixed and disposed surrounding the vertical axis AX1. The reflective surface of the optical-reflective annular mirror 349*a* faces the vertical axis AX1. The stripe-patterned structure-light beams Lc transformed from the light beam segments Lb, which are generated while the aperture 345 of the light-shielding rotary disc 344 is rotating time-sequentially, are projected onto different positions of the optical-reflective annular mirror 349*a*. Afterward, the stripe-patterned structure-light beams Ld reflected by the optical-reflective annular mirror 349*a* converge inward and are projected onto the test object 400.

In addition, as shown in FIG. 5A, FIG. 5B, FIG. 6A, FIG. 6B and FIG. 6C, the three-dimensional measurement system 300 further includes the auxiliary ring light source module 350. The auxiliary ring light source module 350 includes a plurality of light-emitting units 352. In the embodiment shown in FIG. 6A, FIG. 6B and FIG. 6C, the auxiliary ring light source module 350 includes a plurality of light-emitting units 352, but the invention is not limited thereto. In actual applications, the auxiliary ring light source module 350 may include two, three, four or more light-emitting units 352. a plurality of light-emitting units 352 are disposed as ring light system facing the test object 400, and providing a uniform illumination onto the test object 400.

In the embodiments described above, the light-shielding rotary disc of the projection module may rotate, such that the light beam that passes through the aperture formed in the light-shielding rotary disc may form a plurality of light beam segments facing different directions in a time-sequential manner. Each of the light beam segments is transformed into a stripe-patterned structure-light beam and reflected by a fixed optical reflective structure onto the test object. Based on the aforesaid embodiments, the three-dimensional measurement system may operate without implementing multiple sets of projection modules, so as to reduce manufacturing costs and the amount of space used by the device. In addition, with respect to the procedure of reflecting the stripe-patterned structure-light beam onto the test object by the optical reflective structure, it is noted that the optical reflective structure in the invention is a fixed structure instead of a structure that undergoes movement through mechanical means. Therefore, the invention may avoid the problems of accuracy associated with conventional configurations. As a result, measurement errors can be reduced to a minimum, and hence, a precise three-dimensional measurement may be obtained.

The projection module of the three-dimensional measurement system is not limited to implementing the light-shielding rotary disc in the aforesaid embodiments.

Figure 7:
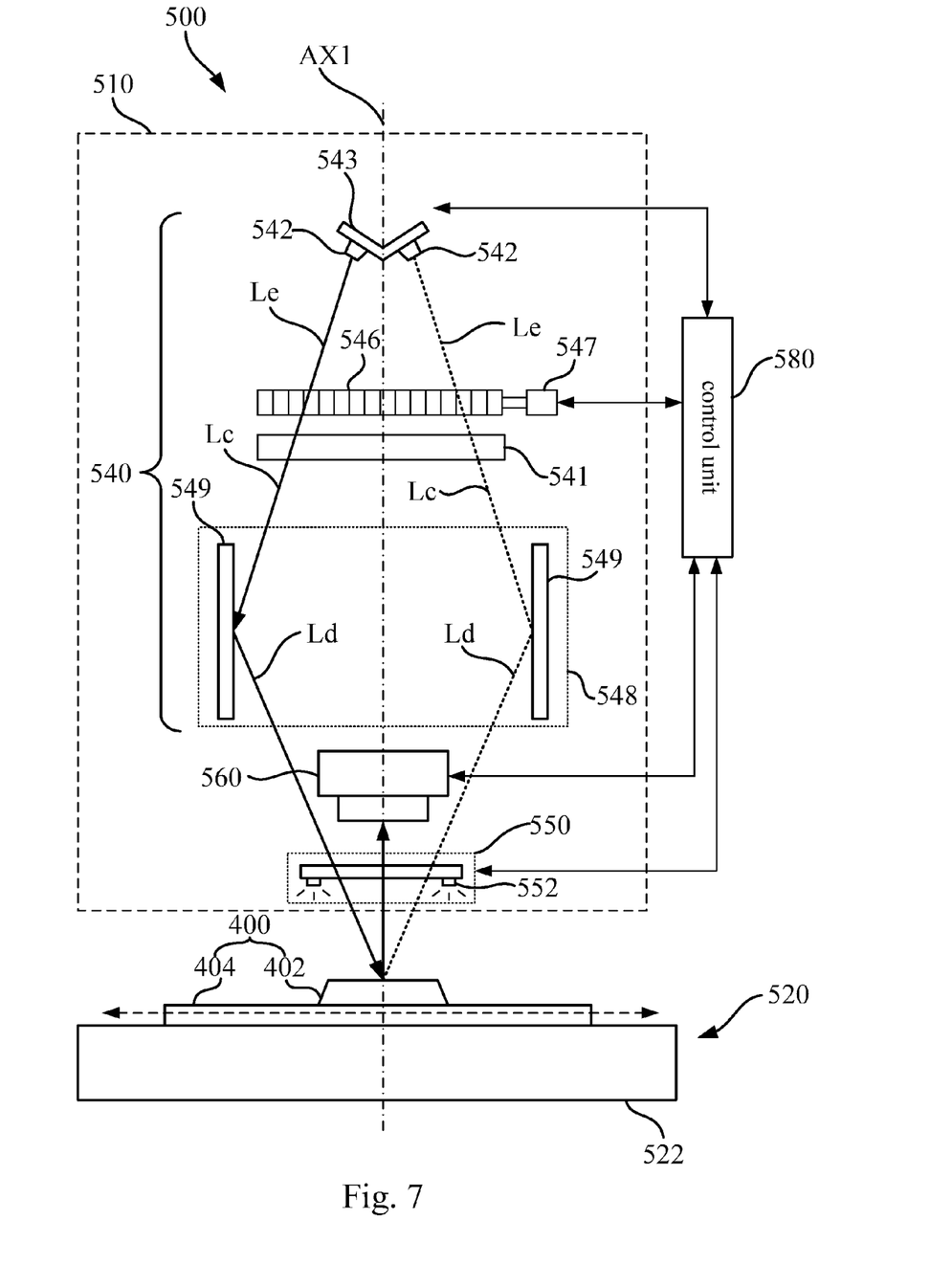
FIG. 7 is a schematic diagram illustrating a three-dimensional measurement system according to another embodiment in the invention.

FIG. 7 is a schematic diagram illustrating a three-dimensional measurement system 500 according to another embodiment in the invention.

As shown in FIG. 7, the three-dimensional measurement system 500 includes a measurement carrier 520, a projection module 540, an image-capturing module 560 and a control unit 580. The measurement platform 522 of the measurement carrier 520 is used for carrying a test object 400. The projection module 540 includes a substrate 543, a plurality of light-emitting diodes 542, a grating unit 546 and an optical-reflective ring structure 548. In addition, the projection module 540 may further include a projection lenses combination 541. The projection lenses combination 541 can be disposed between the grating unit 546 and the optical-reflective ring structure 548.

Figure 8:
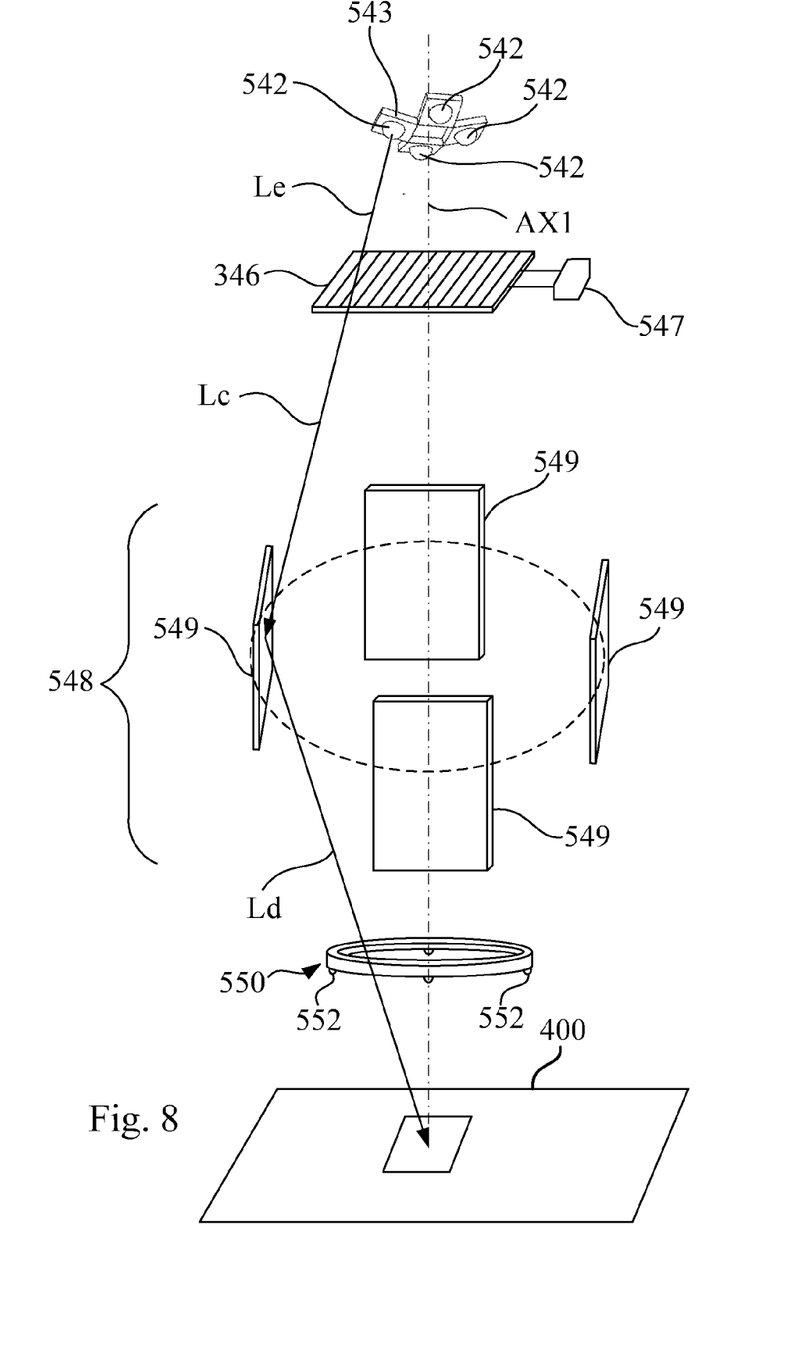
FIG. 8 is a schematic diagram illustrating a projection module of the three-dimensional measurement system of FIG. 7 according to an embodiment of the invention.

Reference is made to FIG. 8, which is a schematic diagram illustrating the projection module 540 of the three-dimensional measurement system 500 according to an embodiment of the invention. The projection module 540 includes the light-emitting diodes 542 (four light-emitting diodes 542 in embodiment of FIG. 8) disposed on the substrate 543. Each of the light-emitting diodes 542 generates a directional light beam Le in a time-sequential manner. The light-emitting diodes 542 are disposed above the test object 400 and are substantially located around a vertical axis AX1 of the measurement platform 522. The grating unit 546 is disposed between the light-emitting diodes 542 and the test object 400, and are used for transforming the directional light beams Le generated by the light-emitting diodes 542 into a plurality of stripe-patterned structure-light beams Lc. The optical-reflective ring structure 548 is disposed between the grating unit 546 and the test object 400 and surrounding the vertical axis AX1. The optical-reflective ring structure 548 is used for reflecting the stripe-patterned structure-light beams Lc to thereby form stripe-patterned structure-light beams Ld. The stripe-patterned structure-light beams Ld reflected by the optical-reflective ring structure 548 are projected onto the test object 400. The image-capturing module 560 is used for capturing a plurality of stripe-patterned images, which are formed after reflection of the stripe-patterned structure-light beams Ld from the test object 400. The control unit 580 is used for controlling the projection module 540 and the image-capturing module 560, and measuring a three-dimensional shape of the test object 400 according to the stripe-patterned images.

In the embodiment shown in FIG. 8, the optical-reflective ring structure 548 includes four planar reflective mirrors 549. The planar reflective mirrors 549 are fixed and disposed surrounding the vertical axis AX1 and facing the vertical axis AX1. When the light-emitting diodes 542 are activated by turn to generate the direction light beams Le in a time-sequential manner, each of the directional light beams Le which is generated by one of the light-emitting diodes 542 is transformed into one of the stripe-patterned structure-light beams Lc and projected onto one of the four planar reflective mirrors 549 corresponding to said one of the light-emitting diodes 542.

The optical-reflective ring structure 548 of the invention is not limited to include four planar reflective mirrors 549. The optical-reflective ring structure 548 may include a different number of planar reflective mirrors 549 corresponding to a different number of light-emitting diodes 542. For details in this regard, reference can be made to the embodiment shown in FIG. 6A, for example, and such details will not be repeated.

The optical-reflective ring structure 548 in another embodiment includes an optical-reflective annular mirror. The optical-reflective annular mirror is fixed and disposed surrounding the vertical axis. A reflective surface of the optical-reflective annular mirror faces the vertical axis. The stripe-patterned structure-light beams transformed from the directional light beams are projected onto different positions of the optical-reflective annular mirror. Details with respect to such an embodiment can be understood by referring to the embodiment in FIG. 6C, and will not be repeated.

The projection module 540 further includes a grating shifter 547 for shifting the grating unit 546 along a horizontal direction, so as to form different phase angles of the stripe-patterned structure-light beams Lc. The image-capturing module 560 further captures a plurality of stripe-patterned images, which are formed after reflection of the stripe-patterned structure-light beams Lc with different phase angles from the test object 400. Since the phase-shifting measuring method for three-dimensional measurement is well-known by those of ordinary skill in the art, details in this regard will not be provided.

In addition, as shown in FIG. 7 and FIG. 8, the three-dimensional measurement system 500 further includes the auxiliary ring light source module 550. The auxiliary ring light source module 550 includes a plurality of light-emitting units 552. In the embodiment shown in FIG. 7 and FIG. 8, the auxiliary ring light source module 550 includes four light-emitting units 552, but the invention is not limited thereto. In actual applications, the auxiliary ring light source module 550 may include two, three, four or more light-emitting units 552. A plurality of light-emitting units 552 are disposed in an annularly spaced apart manner and face the test object 400, for providing brightness from different angles to the test object 400.

In the embodiment shown in FIG. 7, a movable portion 510 of the three-dimensional measurement system 500 may move (e.g., shift, rotate or tilt) along three directional axes (e.g., an X-directional axis, a Y-directional axis and a Z-directional axis) relative the test object 400 and the measurement carrier 520. In this embodiment, the movable portion 510 includes the projection module 540 and the image-capturing module 560 (and may further include the auxiliary ring light source module 550), such that the projection module 540 and the image-capturing module 560 of the three-dimensional measurement system 500 may project onto or capture from different positions, phases or angles of the test object 400. The projection module 540 and the image-capturing module 560 (and also the auxiliary ring light source module 550) within the movable portion 510 are linked. When the movable portion 510 of the three-dimensional measurement system 500 moves, the projection module 540 and the image-capturing module 560 (and also the auxiliary ring light source module 550) move together.

In the aforesaid embodiment, a plurality of light beams is generated by a plurality of light-emitting diodes. Each of the light beams is transformed into a stripe-patterned structure-light beam and reflected by a fixed optical reflective structure onto the test object. Based on the aforesaid embodiment, the three-dimensional measurement system may operate without implementing multiple sets of projection modules, so as to reduce manufacturing costs and the amount of space used by the device. In addition, with respect to the procedure of reflecting the stripe-patterned structure-light beam onto the test object by the optical reflective structure, it is noted that the optical reflective structure in the invention is a fixed structure instead of a structure that undergoes movement through mechanical means. Therefore, the invention may avoid the problems of accuracy associated with conventional configurations. As a result, measurement errors can be reduced to minimum, and hence, a precise three-dimensional measurement may be obtained.

Although the invention has been disclosed with reference to the above embodiments, these embodiments are not intended to limit the invention. It will be apparent to those of skills in the art that various modifications and variations can be made without departing from the spirit and scope of the invention. Thus, the scope of the invention should be defined by the appended claims.

What is claimed is:

1. A three-dimensional measurement system, comprising:
   a measurement platform for carrying a test object;
   a projection module comprising:
   a light-emitting unit for generating a light beam, the light-emitting unit being disposed above the test object and substantially located on a vertical axis of the measurement platform;
   a light-shielding rotary disc disposed between the light-emitting unit and the test object and substantially located on the vertical axis, an aperture being formed in the light-shielding rotary disc and located at away from the vertical axis, the aperture being located at different rotational positions time-sequentially while the light-shielding rotary disc rotates, the light beam passing through the aperture located at the different rotational positions time-sequentially to form a plurality of light beam segments along optical paths in different directions time-sequentially;
   a grating unit disposed between the light-shielding rotary disc and the test object for transforming the light beam segments that pass through the aperture into a plurality of stripe-patterned structure-light beams; and
   an optical-reflective ring structure disposed between the grating unit and the test object and surrounding the vertical axis for reflecting the stripe-patterned structure-light beams onto the test object;
   an image-capturing module for capturing a plurality of stripe-patterned images, which are formed after reflection of the stripe-patterned structure-light beams from the test object; and
   a control unit for controlling the projection module and the image-capturing module and measuring a three-dimensional shape of the test object according to the stripe-patterned images.

2. The three-dimensional measurement system of claim 1, wherein the light-shielding rotary disc is substantially parallel to the measurement platform and rotated about an axis, and the axis coincides with the vertical axis or is parallel to the vertical axis.

3. The three-dimensional measurement system of claim 1, wherein the optical-reflective ring structure comprises a plurality of planar reflective mirrors, and the planar reflective mirrors are fixed and disposed surrounding the vertical axis and facing the vertical axis.

4. The three-dimensional measurement system of claim 3, wherein each of the planar reflective mirrors corresponds to one of the stripe-patterned structure-light beams transformed from the light beam segments generated while the aperture of the light-shielding rotary disc is rotating time-sequentially.

5. The three-dimensional measurement system of claim 1, wherein the optical-reflective ring structure comprises an optical-reflective annular mirror, the optical-reflective annular mirror is fixed and disposed surrounding the vertical axis, and a reflective surface of the optical-reflective annular mirror faces the vertical axis.

6. The three-dimensional measurement system of claim 5, wherein the stripe-patterned structure-light beams transformed from the light beam segments generated while the aperture of the light-shielding rotary disc is rotating time-sequentially are projected onto different positions of the optical-reflective annular mirror.

7. The three-dimensional measurement system of claim 1, wherein the light beam segments diverge outward relative to the vertical axis, and the stripe-patterned structure-light beams converge inward and are projected onto the test object after reflection from the optical-reflective ring structure.

8. The three-dimensional measurement system of claim 1, wherein the projection module further comprises a grating shifter for moving the grating unit horizontally, so as to form different phase angles of the stripe-patterned structure-light beams, and the image-capturing module further captures a plurality of stripe-patterned images, which are formed after reflection of the stripe-patterned structure-light beams with different phase angles from the test object.

* * * * *